(12) United States Patent  
Dickinson

(10) Patent No.: US 7,762,925 B2
(45) Date of Patent: Jul. 27, 2010

(54) ENGINE POWER REDUCTION DURING AUTOMATIC TRANSMISSION SHIFTING

(75) Inventor: Mike Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 11/964,236

(22) Filed: Dec. 26, 2007

(65) Prior Publication Data

US 2008/0156552 A1 Jul. 3, 2008

Related U.S. Application Data

(60) Provisional application No. 60/878,040, filed on Dec. 29, 2006.

(51) Int. Cl.
*B60W 10/04* (2006.01)
(52) U.S. Cl. .................................................. 477/109
(58) Field of Classification Search ................ None
See application file for complete search history.

(56) References Cited

U.S. PATENT DOCUMENTS

| | | | |
|---|---|---|---|
| 5,046,383 A * | 9/1991 | Butts et al. .................. 477/120 |
| 5,746,680 A | 5/1998 | Kato et al. | |
| 5,816,976 A * | 10/1998 | Kuroiwa et al. ............. 477/102 |
| 5,822,708 A * | 10/1998 | Wagner et al. ................ 701/54 |
| 5,839,987 A * | 11/1998 | Sawamura et al. .......... 477/107 |
| 5,876,301 A | 3/1999 | Tabata et al. | |
| 6,482,125 B2 * | 11/2002 | Urasawa ..................... 477/107 |
| 6,689,018 B2 * | 2/2004 | Imamura et al. ............ 477/156 |
| 6,991,583 B2 * | 1/2006 | Saitou et al. ................ 477/109 |
| 7,048,671 B2 * | 5/2006 | Morisawa et al. ........... 477/109 |
| 7,503,875 B2 * | 3/2009 | Fujii et al. .................. 477/107 |
| 7,651,440 B2 * | 1/2010 | Runde ........................ 477/143 |
| 2004/0106498 A1 | 6/2004 | Badillo et al. | |
| 2004/0235617 A1 | 11/2004 | Saitou et al. | |
| 2005/0049112 A1 | 3/2005 | Murakami et al. | |
| 2005/0101435 A1 | 5/2005 | Cowan | |
| 2005/0239597 A1 | 10/2005 | Shimada | |

* cited by examiner

*Primary Examiner*—Dirk Wright
(74) *Attorney, Agent, or Firm*—Mark E. Duell, Esq.; Emerson, Thomson Bennett

(57) ABSTRACT

An engine's power may be gradually reduced during a torque phase of a clutch-to-clutch up-shift within an automatic transmission and then reduced fully during a subsequent inertia phase.

18 Claims, 2 Drawing Sheets

ENGINE POWER REDUCTION DURING AUTOMATIC TRANSMISSION SHIFTING

This application claims priority from U.S. Provisional Application No. 60/878,040, titled Method for Engine-Power Control Throughout Automatic-Transmission Clutch-to-Clutch Up-Shifting, filed Dec. 29, 2006, which is incorporated herein by reference.

I. BACKGROUND OF THE INVENTION

A. Field of Invention

This invention pertains to the art of methods and apparatuses regarding vehicle automatic transmission systems, and more particularly to methods and apparatuses regarding engine power reduction during automatic transmission up-shifting.

B. Description of the Related Art

Automatic transmissions include a plurality of gears and associated components that are manipulated to drive an output shaft using different gear ratios. A transmission controller monitors vehicle operating conditions and driver input to determine whether an up-shift or a down-shift should occur. As is well known in the art, during an up-shift an on-coming component gradually engages a next gear as an off-going component gradually disengages the present gear. Typically, the release of the off-going component is controlled based on the rate of the on-coming component during the up-shift. One example of a control system for an automatic transmission is provided in U.S. Pat. No. 5,746,680 titled CONTROL SYSTEM FOR AUTOMATIC TRANSMISSIONS, which is incorporated herein by reference.

Automatic transmission clutch-to-clutch up-shifting can be divided into two distinct phases: the torque phase and the inertia phase. The torque phase initiates when the on-coming clutch pressure becomes sufficiently high to begin transmitting torque. This is typically judged by a pressure switch in the fluid (typically hydraulic fluid) circuit used to adjust the clutch. The torque phase ends and the inertia phase begins when the gear ratio actually begins to change. This is typically judged when the gear ratio exceeds a threshold setting. The inertia phase is finished when the on-coming clutch is completely engaged (that is, no slip).

Shift-quality depends, in part, upon the accuracy in adjusting clutch pressures relative to the level of engine torque being transmitted. It is known that the level of engine torque transmitted may be estimated based on engine load and engine output shaft speed. As the automatic transmission shifts between gear ratios, one clutch gradually disengages (that is, is off-going) as another clutch gradually engages (that is, is on-coming). This process may be referred to as clutch-to-clutch up (or down) shifting. The decrease and increase of pressure of the off-going and on-coming hydraulic clutches, respectively, determines, at least in part, the operator's feel or ride comfort. It is also known in the automotive industry that during clutch-to-clutch up-shifting in an automatic transmission vehicle, it is beneficial for both passenger shift feeling and clutch durability to temporarily reduce engine power. Engine power reduction is typically achieved by retarding the ignition timing and/or closing the electronically controlled throttle.

One known method for clutch-to-clutch up-shifting reduces engine power in a manner calculated to achieve a substantially complete reduction of engine power at some predetermined point prior to the transition from the torque phase to the inertia phase. This method has the disadvantage of substantial shift-shock and ride discomfort. Another known method achieves substantially complete reduction of engine power during the inertia phase. This method has the disadvantage of increased wear of the automatic transmission components and reduced reliability of the automatic transmission.

What is needed is a method for clutch-to-clutch up-shifting that substantially eliminates both shift-shock and increased wear of the automatic transmission components while simultaneously providing for increased passenger ride comfort.

II. SUMMARY OF THE INVENTION

According to one embodiment of the invention, a method comprises the steps of providing a vehicle having an engine and an automatic transmission, initiating a torque phase of a clutch-to-clutch up-shift within the automatic transmission, gradually reducing the engine's power, initiating an inertia phase of the clutch-to-clutch up-shift, and reducing the engine's power fully during the inertia phase. The engine's power may be fully reduced at substantially the same time as the inertia phase is initiated. Further, the engine's power may be increased at about the time that the inertia phase ends. The engine's power may be increased to substantially full power and may be accomplished by altering an ignition timing or increasing a throttle opening.

According to another embodiment of the invention, a method comprises the steps of providing a vehicle having an engine and an automatic transmission, gradually reducing the engine's power during a torque phase of a clutch-to-clutch up-shift within the automatic transmission, and reducing the engine's power fully at about the time that the clutch-to-clutch up-shift transitions from the torque phase to an inertia phase. The engine's power may be reduced substantially throughout the duration of the torque phase. Further, the engine's power may be increased at about the time that the inertia phase ends.

According to another embodiment of the invention, a vehicle may comprise an engine, an automatic transmission, and a control unit. The control unit may gradually reduce the engine's power during the torque phase of a clutch-to-clutch up-shift within the automatic transmission and may reduce the engine's power fully at about the time that the clutch-to-clutch up-shift transitions from the torque phase to an inertia phase. The automatic transmission may comprise at least a first and second hydraulic clutch.

One advantage of this invention is that it eliminates the "shift-shock" commonly felt by passengers in a vehicle that is caused by a complete reduction in engine power occurring prior to the transition from the inertia phase to the torque phase. Further, by completely reducing engine power at the transition from the inertial phase to the torque phase the ride comfort felt by the passenger is increased.

Another advantage of this invention is that it decreases the component wear on automatic transitions. A complete reduction of engine power that occurs after the transition from the inertia phase to the torque phase causes increased stress on the automatic transmission components.

Still other benefits and advantages will become apparent to those skilled in the art to which it pertains upon a reading and understanding of the following detailed specification.

III. BRIEF DESCRIPTION OF THE DRAWINGS

The invention may take physical form in certain parts and arrangement of parts embodiments of which will be described in detail in this specification and illustrated in the accompanying drawings which form a part hereof and wherein.

IV. DETAILED DESCRIPTION OF THE INVENTION

Figure 1:
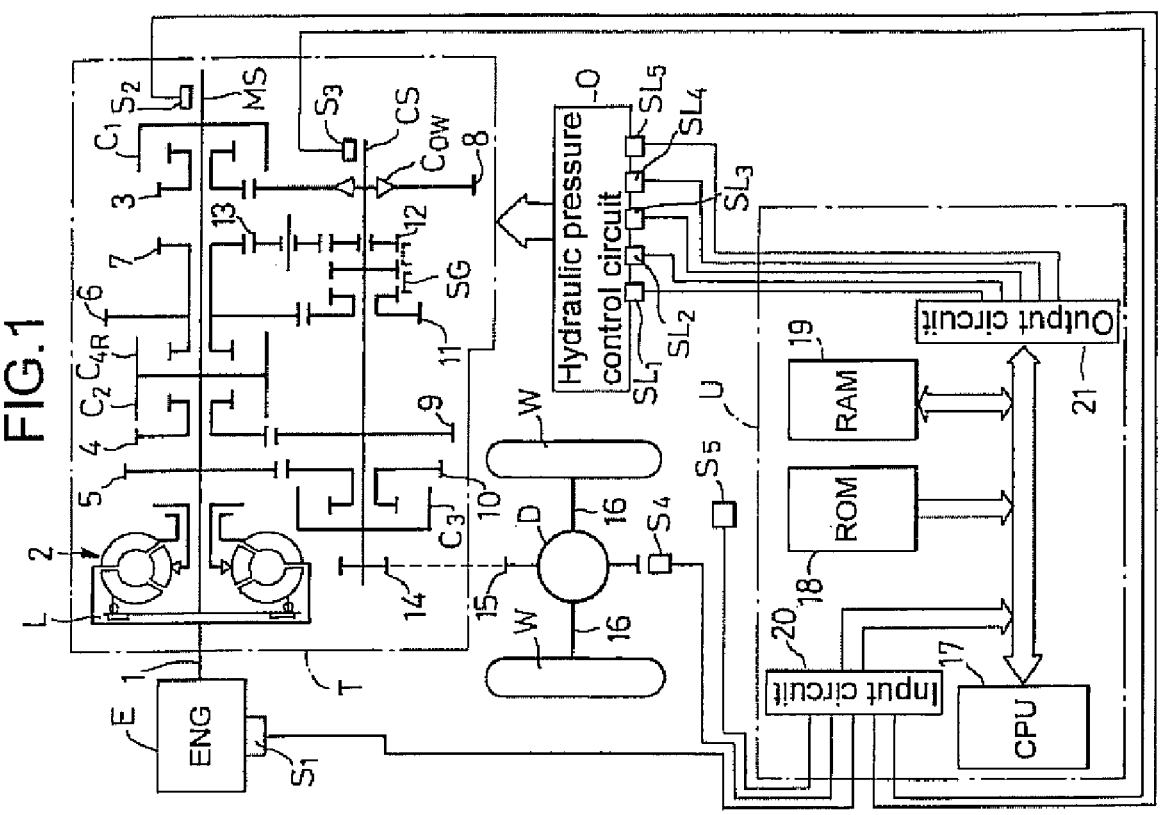
FIG. 1 is a schematic representation showing an arrangement of an automatic transmission installed on a vehicle according to one embodiment of the invention.

Referring now to the drawings wherein the showings are for purposes of illustrating embodiments of the invention only and not for purposes of limiting the same, FIG. 1 shows an automatic transmission T for a vehicle and includes a main shaft MS connected to a crankshaft 1 of an engine E through a torque converter 2 having a lock-up clutch L, and a counter shaft CS connected to the main shaft MS through a plurality of gear trains. The engine E may be a device designed to convert energy into mechanical force or motion. This invention will work with any engine chosen with sound engineering judgment. Non-limiting examples include internal combustion engines, external combustion engines, electric engines and hybrid engines that perform both as internal combustion engines and as electric engines. The automatic transmission T may be a device designed to transfer force between machines or mechanisms, often with changes in torque and speed, using at least one gear set and at least one clutch. The specific type of automatic transmission is not intended as a limitation for the invention. Any type of automatic transmission utilizing on-going and off-going clutch systems, chosen with sound engineering judgment, may be used.

With continued reference to FIG. 1, according to one embodiment, the main shaft MS make carry a main first-shift gear 3, a main second-shift gear 4, a main third-shift gear 5, a main fourth-shift gear 6 and a main reverse gear 7. The counter shaft CS may carry a counter first-shift gear 8 that may be meshed with main first-shift gear 3, a counter second-shift gear 9 that may be meshed with main second-shift gear 4, a counter third-shift gear 10 that may be meshed with main third-shift gear 5, a counter fourth-shift gear 11 that may be meshed with main fourth-shift gear 6 and a counter reverse gear 12 that may be connected to the main reverse gear 7 through a reverse idle gear 13.

With continuing reference to FIG. 1, according to one embodiment, the main first-shift gear 3 may be relatively rotatably carried on the main shaft MS and may be coupled to the main shaft MS by a first-shift clutch $C_1$ to establish a first-shift stage. The first-shift clutch $C_1$ may be maintained in an engaged state even during establishment of second through fourth shift stages and hence, the counter first-shift gear 8 may be supported through a one-way clutch $C_{OW}$. The main second-shift gear 4, that may be relatively rotatably carried on the main shaft MS, may be coupled to the main shaft MS by a second-shift clutch $C_2$ to establish a second-shift stage. The counter third-shift gear 10, that may be relatively rotatably carried on the counter shaft CS, may be coupled to the counter shaft CS by a third-shift clutch $C_3$ to establish a third-shift stage. The main fourth-shift gear 6, that may be relatively rotatably carried on the main shaft MS, may be coupled to the main shaft MS by a fourth-shift reverse clutch $C_{4R}$ in a condition in which the counter fourth-shift gear 11, that may be relatively rotatably carried on the counter shaft CS, may be coupled to the counter shaft CS by a selector gear SG, to establish a fourth-shift stage. The counter reverse gear 7, that may be relatively rotatably carried on the main shaft MS, may be coupled to the main shaft MS by the forth-shift reverse clutch $C_{4R}$ in a condition in which counter reverse gear 12, that may be relatively rotatably carried on the counter shaft CS, may be coupled to the counter shaft CS by the selector gear SG, to establish a backward-shift stage. The rotation of the counter shaft CS may be transmitted through a final drive gear 14 and a final driven gear 15 to a differential D and then transmitted therefrom through the left and light axles 16a, 16b to the driving wheels $W_1$, $W_2$.

With continuing reference to FIG. 1, all electronic control unit U may include a CPU 17, a read only memory (ROM) 18, a random access memory (RAM) 19, an input circuit 20 and an output circuit 21. Inputs to the input circuit 20 of the electronic control unit U may include, a throttle opening degree TH that may be detected by a throttle opening degree sensor $S_1$ that may be mounted on engine E, a vehicle speed that may be detected by a vehicle speed sensor $S_4$ that may be mounted on a differential D, and a shift selecting lever position S that may be detected by a shift selecting lever position sensor $S_5$.

Still referring to FIG. 1, the output circuit 21 of the electronic control unit U may be connected to the shift solenoids $SL_1$ and $SL_2$, the lockup clutch solenoids $SL_3$ and $SL_4$ and a shifting clutch hydraulic pressure solenoid $SL_5$ that may be provided in a hydraulic pressure control circuit O, that may control the operation of the first-shift clutch $C_1$, the second-shift clutch $C_2$, the third-shift clutch $C_3$, the fourth-shift reverse clutch $C_{4R}$, the selector gear SG and the lock-up clutch L of the automatic transmission T.

Figure 2:
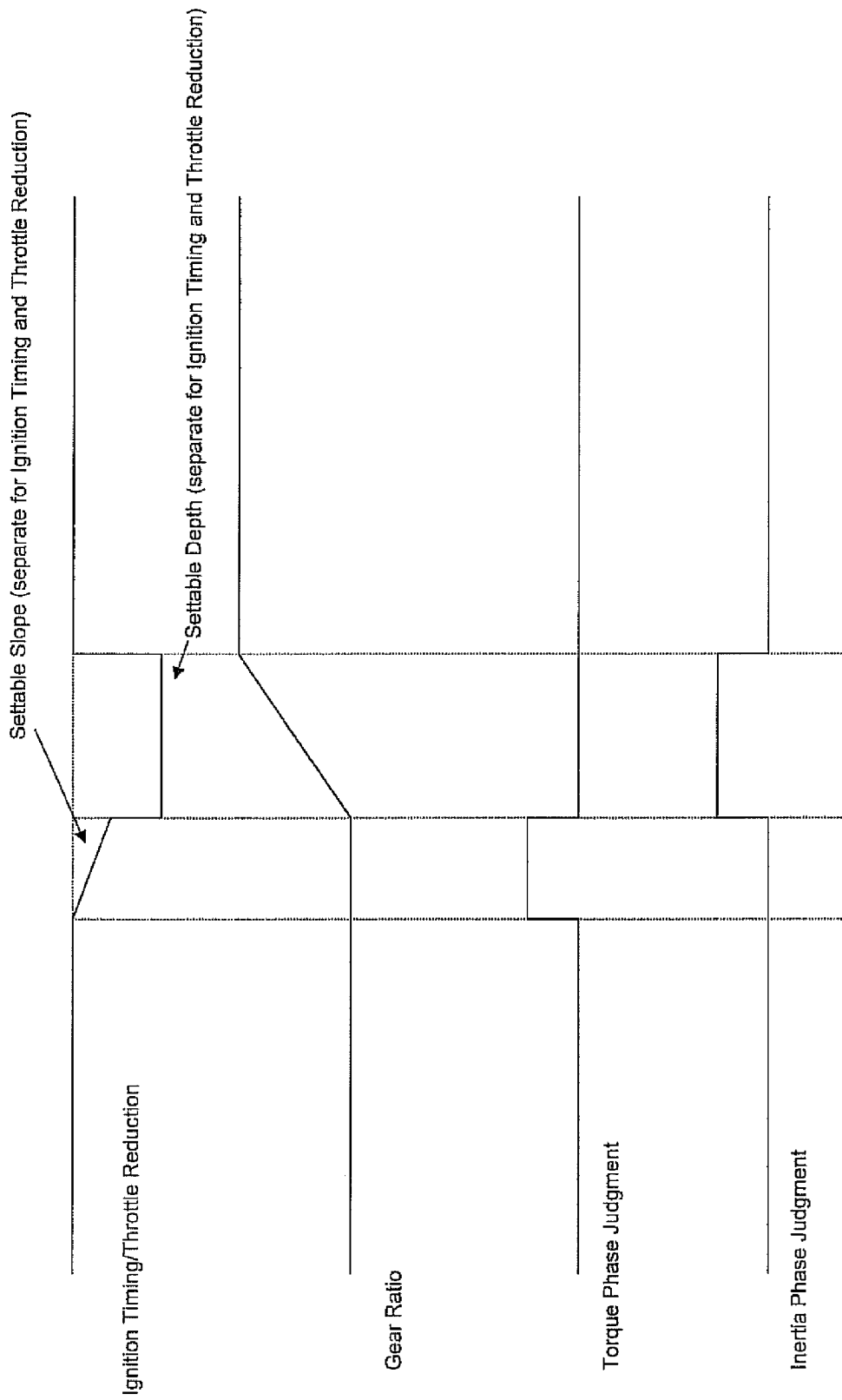
FIG. 2 is an illustration of the general timing relationship between elements in an embodiment of the automatic transmission clutch-to-clutch up-shifting method.

With reference now to FIGS. 1-2, according to one embodiment of this invention, shifting between gear ratios may occur in two distinct phases: a torque phase and an inertia phase. During the torque phase, the speed of the main shaft MS, and thus engine power, from the torque converter 2 may be gradually reduced throughout the duration of the torque phase. There is no limitation directed to the various engine power rates of reduction during the torque phase, and both linear and non-linear rates of reduction can be useful. Furthermore, rates of reduction need not be consistently linear or non-linear throughout the duration of the torque phase, and various combinations of linear and non-linear rates of reduction may be employed. FIG. 2 illustrates one embodiment of an overall generally linear reduction in engine power during the torque phase via retardation of ignition timing, throttle reduction, or a combination of both. The speed of main shaft MS, and therefore engine power, may be reduced to approximately zero at the end of the torque phase. During the inertia phase, the speed of main shaft MS may remain approximately zero. The speed of main shaft MS may be increased to a predetermined speed substantially instantaneously at the end of the inertia phase.

With reference again to FIG. 1, in operation according to one embodiment of this invention, a clutch-to-clutch up-shift may comprise a main first-shift gear 3 that may be initially coupled to the main shaft MS to drive the counter shaft CS at a first gear ratio. The electronic control unit U may signal an up-shift and the first-shift clutch $C_1$ may gradually decrease engagement of the first-shift gear 3 with the main shaft MS (that is, is off-going). A second-shift clutch $C_2$ may gradually increase engagement of a second-shift gear 4 with the main shaft MS (that is, is on-coming) until the clutch-pressure associated with the second-shift clutch $C_2$ becomes sufficient to begin transmitting torque thus initiating the start of the torque phase. The clutch-pressure may be determined by a switch (not shown) located in the hydraulic circuit O or by other known methods chosen with sound engineering judgment. Embodiments provided herein are not limited to a torque phase having any specific duration, and any known useful torque phase duration chosen with sound engineering judgment may be employed. During the torque phase, the electronic control unit U may control the gradual reduction in engine power by altering an ignition timing (not shown) and/or by decreasing of the throttle opening degree TH.

With reference now to FIGS. 1-2, according to one embodiment, the torque phase may end and the inertia phase may begin as the second-shift clutch $C_2$ increases engagement and a gear ratio change begins to occur. The end of the torque phase and the beginning of the inertia phase may be determined to begin when the gear ratio exceeds a threshold setting. As mentioned above, at the end of the torque phase, a complete reduction in engine power may have occurred. Throughout the duration of the inertia phase, the complete reduction of engine power may remain substantially constant. Embodiments provide for slight alterations in engine power throughout the duration of the inertia phase. Maintaining complete reduction in engine power throughout the duration of the inertia phase may be achieved by maintaining the engine power conditions, such as altering the ignition timing and decreasing the throttle opening degree TH, that may have been engaged at the beginning of the inertia phase. Embodiments provide for separate power-reduction settings for the altered ignition timing and the decreased throttle opening degree TH in order to maintain complete reduction in engine power throughout the duration of the inertia phase.

With continuing reference to FIGS. 1-2, according to one embodiment of this invention, the first-shift clutch $C_1$ may completely disengage the first-shift gear 3 from the input shaft 22 and the second-shift clutch $C_2$ may couple the second-shift gear 4 with the main shaft MS to drive counter shaft CS at a second gear ratio to end the inertia phase and complete a gear shift. The inertia phase can be understood as ending when the on-coming clutch is completely engaged and no slip is incurred. At the end of the inertia phase, one embodiment provides for a substantially instantaneous increase in engine power. The substantially instantaneous increase in engine power may be achieved by any variety of known means for doing so chosen with sound engineering judgment, and there is no limitation directed to how the increase in power is achieved. A non-limiting example of increasing engine power is to set both the ignition timing and throttle opening degree TH to the same settings as those just prior to the beginning of the torque phase. Alternate useful embodiments include substantially instantaneously increasing engine power by altering the ignition timing and increasing the throttle opening degree TH to settings that will achieve full engine power.

With reference now to FIG. 2, embodiments that reduce engine power using a combination of both elements: (i) retarding the ignition timing; and, (ii) reducing the throttle opening degree TH, may describe the respective independent engine power-reduction contributions of the two elements (that is, (i) and (ii)) using separate power-reduction slopes throughout the torque phase. In other words, in order to reduce engine power gradually throughout the torque phase, a non-limiting illustrative embodiment (i) retards the ignition timing only slightly while at the same time (ii) gradually reducing throttle opening degree TH to a greater degree while approaching the end of the torque phase. Various other combinations for reducing engine power via retarding ignition timing and throttle opening degree TH reduction may be used, and there is no limitation on any particular combination of those two elements. Additional power-reduction elements known in the art and chosen with sound engineering judgment may also be used with the above described elements of reducing ignition timing and throttle opening degree TH reduction. There is no limitation directed to how those prior-art power-reduction elements may be used in combination with the above-recited elements of retarding ignition timing and throttle opening degree TH reduction.

Various embodiments have been described, hereinabove. It will be apparent to those skilled in the art that the above methods and apparatuses may incorporate changes and modification without departing from the general scope of this invention. It is intended to include all such modification and alterations in so far as they come within the scope of the appended claims or the equivalents thereof.

Having described the invention, it is now claimed:

1. A method comprising the steps of:
   (a) providing a vehicle having an engine and an automatic transmission;
   (b) initiating a torque phase of a clutch-to-clutch up-shift within the automatic transmission;
   (c) gradually reducing the engine's power;
   (d) initiating an inertia phase of the clutch-to-clutch up-shift; and,
   (e) reducing the engine's power fully at substantially the same time the inertia phase is initiated.

2. The method of claim 1 further comprising the step of:
   increasing the engine's power at about a time that the inertia phase ends.

3. The method of claim 2 wherein the step of, increasing the engine's power at about a time that the inertia phase ends, comprises the step of:
   increasing the engine's power to substantially full power.

4. The method of claim 2 wherein the step of, increasing the engine's power at about a time that the inertia phase ends, comprises the step of:
   altering an ignition timing.

5. The method of claim 2 wherein the step of, increasing the engine's power at about a time that the inertia phase ends, comprises the step of:
   increasing a throttle opening.

6. The method of claim 1 wherein the step of, gradually reducing the engine's power, comprises the step of:
   altering an ignition timing.

7. The method of claim 1 wherein the step of, gradually reducing the engine's power, comprises the step of:
   decreasing a throttle opening.

8. A method comprising the steps of:
   (a) providing a vehicle having an engine and an automatic transmission;
   (b) gradually reducing the engine's power during a torque phase of a clutch-to-clutch up-shift within the automatic transmission; and,
   (c) reducing the engine's power fully at about a first time that the clutch-to-clutch up-shift transitions from the torque phase to an inertia phase.

9. The method of claim 8 further comprising the step of:
   increasing the engine's power at about a second time that the inertia phase ends.

10. The method of claim 8 wherein step (b) comprises the step of:
   reducing the engine's power substantially throughout the duration of the torque phase.

11. A vehicle comprising:
   an engine;
   an automatic transmission; and,
   a control unit that: (1) gradually reduces the engine's power during a torque phase of a clutch-to-clutch up-shift within the automatic transmission; and, (2) reduces the engine's power fully at about a first time that the clutch-to-clutch up-shift transitions from the torque phase to an inertia phase.

12. The vehicle of claim 11 wherein the automatic transmission comprises:

at least a first and a second hydraulic clutch.

13. The vehicle of claim 11 wherein the control unit: reduces the engine's power by altering an ignition timing.

14. The vehicle of claim 11 wherein the control unit: reduces the engine's power by decreasing a throttle opening 15. The vehicle of claim 11 wherein the control unit: increases the engine's power to substantially full power substantially simultaneously as the inertia phase ends.

16. The vehicle of claim 11 wherein the engine is: an internal combustion engine.

17. The vehicle of claim 11 wherein the engine is: an electric engine.

18. The vehicle of claim 11 wherein the engine is: a hybrid engine.

* * * * *